(12) United States Patent
Jacoby et al.

(10) Patent No.: US 12,167,950 B2
(45) Date of Patent: Dec. 17, 2024

(54) DENTAL IMPLANT

(71) Applicant: MIS Implants Technologies Ltd., Misgav (IL)

(72) Inventors: Yuval Jacoby, Tel-Aviv (IL); Nitzan Bichacho, Tel-Aviv (IL)

(73) Assignee: MIS Implants Technologies Ltd., Misgav (IL)

( * ) Notice: Subject to any disclaimer, the term of this patent is extended or adjusted under 35 U.S.C. 154(b) by 800 days.

(21) Appl. No.: 16/575,467

(22) Filed: Sep. 19, 2019

(65) Prior Publication Data

US 2020/0078146 A1  Mar. 12, 2020

Related U.S. Application Data

(62) Division of application No. 14/123,289, filed as application No. PCT/IL2012/000218 on Jun. 3, 2012, now Pat. No. 10,441,386.

(Continued)

(51) Int. Cl.
*A61C 8/00* (2006.01)
*A61C 8/02* (2006.01)

(52) U.S. Cl.
CPC .......... *A61C 8/0075* (2013.01); *A61C 8/0006* (2013.01); *A61C 8/0018* (2013.01); *A61C 8/0022* (2013.01); *A61C 8/0066* (2013.01); *A61C 8/0068* (2013.01); *A61C 8/0069* (2013.01); *A61C 8/0077* (2013.01)

(58) Field of Classification Search
CPC ... A61C 8/0006; A61C 8/0075; A61C 8/0015; A61C 8/0022; A61C 8/0066; A61C 8/0068; A61C 8/0069; A61C 8/0077
See application file for complete search history.

(56) References Cited

U.S. PATENT DOCUMENTS

| 4,722,688 A | 2/1988 | Lonca |
| 4,960,381 A | 10/1990 | Niznick |

(Continued)

FOREIGN PATENT DOCUMENTS

| CN | 103153225 | 6/2013 |
| DE | 102008063397 | 7/2010 |

(Continued)

OTHER PUBLICATIONS

Examination Report Dated Sep. 30, 2020 From the Instituto Mexicano de la Propiedad Industrial, IMPI, Secretaria de Economia, Direccion Divisional de Patentes Re. Application No. MX/a/2016/010825 and Its Translation Into English. (8 Pages).

(Continued)

*Primary Examiner* — Nicholas D Lucchesi
*Assistant Examiner* — Hao D Mai

(57) ABSTRACT

A dental implant including an implant body having a top surface, and at least one non-annular cutaway portion longitudinally extending downwardly from the top surface along one side of the body and outwardly to the periphery, and a method for making the implant. The implant body preferably includes a body portion and a head portion integrally formed with the body portion, the body portion has a periphery and the head portion has a non-circular periphery, and the periphery of the head portion is smaller than the periphery of the body portion.

22 Claims, 12 Drawing Sheets

Related U.S. Application Data

(60) Provisional application No. 61/492,382, filed on Jun. 2, 2011.

(56) References Cited

U.S. PATENT DOCUMENTS

| | | | |
|---|---|---|---|
| 5,336,225 | A | 8/1994 | Zang |
| 5,399,090 | A | 3/1995 | Padros-Fradera |
| 5,454,811 | A | 10/1995 | Huebner |
| 5,651,675 | A | 7/1997 | Singer |
| 5,785,525 | A | 7/1998 | Weissman |
| 6,001,100 | A | 12/1999 | Sherman et al. |
| 6,039,568 | A | 3/2000 | Hinds |
| 6,723,099 | B1 | 4/2004 | Goshert |
| 6,953,463 | B2 | 10/2005 | West, Jr. |
| 7,309,231 | B2 | 12/2007 | Engman |
| D616,097 | S | 5/2010 | Johnson et al. |
| 8,197,255 | B2 | 6/2012 | Fromovich et al. |
| 9,820,831 | B2 | 11/2017 | Cho |
| 2004/0170946 | A1 | 9/2004 | Lyren |
| 2005/0136380 | A1 | 6/2005 | Niznick |
| 2005/0164146 | A1* | 7/2005 | Cantor .............. A61C 8/0022 433/173 |
| 2006/0003290 | A1 | 1/2006 | Niznick |
| 2006/0078847 | A1* | 4/2006 | Kwan .............. A61C 8/008 433/173 |
| 2006/0223030 | A1 | 10/2006 | Dinkelacker |
| 2006/0269890 | A1 | 11/2006 | Mundwiler et al. |
| 2007/0059666 | A1 | 3/2007 | Zickman |
| 2007/0072148 | A1 | 3/2007 | Memmolo et al. |
| 2007/0190491 | A1 | 8/2007 | Blackbeard |
| 2008/0280254 | A1* | 11/2008 | Ackermann ......... A61C 8/0022 433/174 |
| 2008/0299516 | A1 | 12/2008 | Aldecoa |
| 2009/0023109 | A1 | 1/2009 | Jinton et al. |
| 2009/0092944 | A1 | 4/2009 | Pirker |
| 2009/0239195 | A1 | 9/2009 | Wohrle et al. |
| 2009/0325126 | A1 | 12/2009 | Fromovich et al. |
| 2010/0119993 | A1 | 5/2010 | Schulter et al. |
| 2010/0184003 | A1 | 7/2010 | Danza et al. |
| 2010/0196850 | A1 | 8/2010 | Koenig |
| 2010/0196853 | A1 | 8/2010 | Zipprich et al. |
| 2011/0070558 | A1 | 3/2011 | Park et al. |
| 2011/0223562 | A1 | 9/2011 | Zipprich |
| 2012/0164599 | A1 | 6/2012 | Holmstrom et al. |
| 2012/0178049 | A1 | 7/2012 | Holmstrom et al. |
| 2012/0251977 | A1* | 10/2012 | Vercellotti ........... A61C 8/0021 433/174 |
| 2012/0264085 | A1 | 10/2012 | Hansson et al. |
| 2013/0230825 | A1 | 9/2013 | Kenk et al. |
| 2013/0244203 | A1 | 9/2013 | Magnusson et al. |
| 2014/0030674 | A1 | 1/2014 | Nguyen |
| 2014/0106305 | A1 | 4/2014 | Jacoby et al. |
| 2014/0205969 | A1 | 7/2014 | Marlin |
| 2016/0317253 | A1 | 11/2016 | Duerr |
| 2017/0049539 | A1 | 2/2017 | Jacoby et al. |

FOREIGN PATENT DOCUMENTS

| | | |
|---|---|---|
| EP | 1062916 | 5/2000 |
| EP | 1882458 | 1/2008 |
| EP | 1943980 | 7/2008 |
| EP | 2444026 | 4/2012 |
| EP | 2510900 | 10/2012 |
| EP | 2578182 | 4/2013 |
| JP | 2003190187 | 7/2003 |
| JP | 2004-529698 | 9/2004 |
| JP | 2013-078428 | 5/2013 |
| KR | 10-1050236 | 7/2011 |
| KR | 10-2013-0113776 | 10/2013 |
| WO | WO 97/06930 | 2/1997 |
| WO | WO 01/06944 | 2/2001 |
| WO | WO 02/0080804 | 10/2002 |
| WO | WO 2005/065571 | 7/2005 |
| WO | WO 2008/157137 | 12/2008 |
| WO | WO 2008/157138 | 12/2008 |
| WO | WO 2010/072211 | 7/2010 |
| WO | WO 2012/164560 | 12/2012 |
| WO | WO 2012/173577 | 12/2012 |
| WO | WO 2013/037729 | 3/2013 |
| WO | WO 2013/037730 | 3/2013 |
| WO | WO 2013/186765 | 12/2013 |
| WO | WO 2015/125139 | 8/2015 |

OTHER PUBLICATIONS

Final Official Action Dated Dec. 15, 2020 from the US Patent and Trademark Office Re. U.S. Appl. No. 15/119,775. (21 pages).
Hearing Notice Dated Mar. 31, 2022 from the Indian Patent Office Re. Application No. 2408/MUMNP/2013. (2 pages).
Requisition by the Examiner Dated Oct. 6, 2021 From the Innovation, Science and Economic Development Canada, Canadian Intellectual Property Office Re. Application No. 2,939,062. (3 Pages).
Translation Dated Jun. 11, 2021 of Examination Report Dated Jun. 1, 2021 From the Instituto Mexicano de la Propiedad Industrial, Direccion Divisional de Patentes Re. Application No. MX/a/2016/010825. (4 Pages).
Office Action Dated Jun. 22, 2021 From the Israel Patent Office Re. Application No. 247345 and Its Translation Into English. (5 Pages).
Applicant-Initiated Interview Summary Dated Dec. 4, 2018 From the US Patent and Trademark Office Re. U.S. Appl. No. 15/119,775. (3 pages).
Applicant-Initiated Interview Summary Dated Nov. 14, 2014 From the US Patent and Trademark Office Re. U.S. Appl. No. 14/123,289.
Applicant-Initiated Interview Summary Dated Jan. 23, 2019 From the US Patent and Trademark Office Re. U.S. Appl. No. 14/123,289. (3 pages).
Applicant-Initiated Interview Summary Dated Dec. 26, 2018 From the US Patent and Trademark Office Re. U.S. Appl. No. 15/119,775. (3 pages).
Communication Pursuant to Article 94(3) EPC Dated Sep. 12, 2018 From the European Patent Office Re. Application No. 15713237.4.
Communication Pursuant to Article 94(3) EPC Dated Sep. 18, 2017 From the European Patent Office Re. Application No. 12793774.6. (4 Pages).
Communication Pursuant to Article 94(3) EPC Dated Aug. 29, 2019 From the European Patent Office Re. Application No. 15713237.4. (5 Pages).
Communication Relating to the Results of the Partial International Search Dated Jun. 23, 2015 From the International Searching Authority Re. Application No. PCT/IL2015/050185.
Decision of Reexamination Dated Jan. 24, 2018 From the State Intellectual Property Office of the People's Republic of China Re. Application No. 201280037636.2 and Its Machine Translation Into English. (44 Pages).
Decision of Reexamination Dated Jan. 24, 2018 From the State Intellectual Property Office of the People's Republic of China Re. Application No. 201280037636.2. (17 Pages).
Decision of Rejection Dated Sep. 29, 2016 From the State Intellectual Property Office of the People's Republic of China Re. Application No. 201280037636.2 and Its Translation Into English.
Examination Report Dated Nov. 9, 2016 From the Republica de Colombia, Superintendencia de Industria y Comercio Re. Application No. NC2016/0000996 and Its Translation Into English. (4 Pages).
Examination Report Dated Sep. 16, 2016 From the Republica de Colombia, Superintendencia de Industria y Comercio Re. Application No. NC2016/0000996 and Its Translation Into English. (5 Pages).
International Preliminary Report on Patentability Dated Sep. 1, 2016 From the International Bureau of WIPO Re. Application No. PCT/IL2015/050185.
International Preliminary Report on Patentability Dated Dec. 12, 2013 From the International Bureau of WIPO Re. Application No. PCT/IL2012/000218.
International Search Report and the Written Opinion Dated Sep. 13, 2012 From the International Searching Authority Re. Application No. PCT/IL2012/000218.

(56) References Cited

OTHER PUBLICATIONS

International Search Report and the Written Opinion Dated Aug. 20, 2015 From the International Searching Authority Re. Application No. PCT/IL2015/050185.
Notice of Preliminary Rejection Dated Feb. 18, 2019 From the Korean Intellectual Property Office, Patent Examination Policy Office Re. Application No. 10-2013-7035023 and Its Translation Into English. (11 Pages).
Notice of Reason for Rejection Dated Jan. 22, 2019 From the Japan Patent Office Re. Application No. 2016-553475 and Its Translation Into English. (9 Pages).
Notice of Reason for Rejection Dated Mar. 25, 2016 From the Japan Patent Office Re. Application No. 2014-513308 and Its Translation Into English.
Notice of Reason for Rejection Dated Aug. 27, 2019 From the Japan Patent Office Re. Application No. 2016-553475 and Its Translation Into English. (9 Pages).
Notification of Office Action and Search Report Dated Nov. 2, 2015 From the State Intellectual Property Office of the People's Republic of China Re. Application No. 201280037636.2.
Notification of Office Action and Search Report Dated Jun. 20, 2016 From the State Intellectual Property Office of the People's Republic of China Re. Application No. 201280037636.2.
Notification of Office Action and Search Report Dated Jan. 21, 2019 From the State Intellectual Property Office of the People's Republic of China Re. Application No. 201580020795.5. (9 Pages).
Notification of Office Action and Search Report Dated May 31, 2018 From the State Intellectual Property Office of the People's Republic of China Re. Application No. 201580020795.5 and Its Summary in English. (8 Pages).
Notification of Office Action Dated Sep. 25, 2019 From the State Intellectual Property Office of the People's Republic of China Re. Application No. 201580020795.5. (9 Pages).
Notification of Reexamination Dated Jun. 28, 2017 From the State Intellectual Property Office of the People's Republic of China Re. Application No. 201280037636.2 and Its Translation Into English. (19 Pages).
Office Action Dated Jan. 18, 2017 From the Israel Patent Office Re. Application No. 229758 and Its Translation Into English. (5 Pages).
Office Action Dated Dec. 22, 2016 From the Israel Patent Office Re. Application No. 229758 and Its Translation Into English. (6 Pages).
Official Action Dated Jul. 1, 2014 From the US Patent and Trademark Office Re. U.S. Appl. No. 14/123,289.
Official Action Dated Nov. 4, 2016 From the US Patent and Trademark Office Re. U.S. Appl. No. 14/123,289.
Official Action Dated Apr. 6, 2017 From the US Patent and Trademark Office Re. U.S. Appl. No. 14/123,289. (19 pages).
Official Action Dated Apr. 7, 2016 From the US Patent and Trademark Office Re. U.S. Appl. No. 14/123,289.
Official Action Dated Jun. 13, 2019 From the US Patent and Trademark Office Re. U.S. Appl. No. 15/119,775. (37 Pages).
Official Action Dated Jul. 14, 2015 From the US Patent and Trademark Office Re. U.S. Appl. No. 14/123,289.
Official Action Dated Nov. 17, 2017 From the US Patent and Trademark Office Re. U.S. Appl. No. 14/123,289. (16 pages).
Official Action Dated Jun. 29, 2018 From the US Patent and Trademark Office Re. U.S. Appl. No. 14/123,289. (13 pages).
Official Decision of Rejection Dated Nov. 4, 2016 From the Japan Patent Office Re. Application No. 2014-513308 and Its Translation Into English. (9 Pages).
Patent Examination Report Dated May 24, 2019 From the Australian Government, IP Australia Re. Application No. 2015220389. (7 Pages).
Provision of the Minutes in Accordance With Rule 124(4) EPC Dated Apr. 10, 2019 From the European Patent Office Re. Application No. 12793774.6. (8 Pages).
Request for Examination Dated May 23, 2016 From the ROSPATENT, Federal Government Institutions, Federal Institute of Industrial Property of the Federal Service for Intellectual Property, Patent and Trademarks of the Russian Federation Re. Application No. 2013158082 and Its Translation Into English.
Restriction Official Action Dated Nov. 16, 2017 From the US Patent and Trademark Office Re. U.S. Appl. No. 15/119,775. (7 pages).
Restriction Official Action Dated Aug. 28, 2018 From the US Patent and Trademark Office Re. U.S. Appl. No. 15/119,775. (9 pages).
Summons to Attend Oral Proceedings Pursuant to Rule 115(1) EPC Dated Jul. 19, 2018 From the European Patent Office Re. Application No. 12793774.6. (6 Pages).
Supplementary European Search Report and the European Search Opinion Dated Nov. 4, 2014 From the European Patent Office Re. Application No. 12793774.6.
Translation Dated Feb. 14, 2019 of Notification of Office Action Dated Jan. 21, 2019 From the State Intellectual Property Office of the People's Republic of China Re. Application No. 201580020795.5. (6 Pages).
Translation Dated Nov. 17, 2015 of Notification of Office Action and Search Report Dated Nov. 2, 2015 From the State Intellectual Property Office of the People's Republic of China Re. Application No. 201280037636.2.
Translation Dated Oct. 17, 2019 of Notification of Office Action Dated Sep. 25, 2019 From the State Intellectual Property Office of the People's Republic of China Re. Application No. 201580020795.5. (8 Pages).
Translation Dated Jun. 28, 2018 of Notification of Office Action Dated May 31, 2018 From the State Intellectual Property Office of the People's Republic of China Re. Application No. 201580020795.5. (4 Pages).
Translation of Notification of Office Action Dated Jun. 20, 2016 From the State Intellectual Property Office of the People's Republic of China Re. Application No. 201280037636.2.
Abuhussein et al. "The Effect of Thread Pattern Upon Implant Osseointegration", Clinical Oral Implant Research, 21: 129-136, 2010.
Requisition by the Examiner Dated Mar. 31, 2021 From the Innovation, Science and Economic Development Canada, Canadian Intellectual Property Office Re. Application No. 2,939,062. (4 Pages).
Notice of Allowance Dated May 5, 2021 from the US Patent and Trademark Office Re. U.S. Appl. No. 15/119,755. (10 pages)
Summons to Attend Oral Proceedings Pursuant to Rule 115(1) EPC Dated Jul. 23, 2020 From the European Patent Office Re. Application No. 15713237.4. (10 Pages).
Office Action Dated Mar. 4, 2020 From the Israel Patent Office Re. Application No. 247345. (5 Pages).
Notice of Reason for Rejection Dated Apr. 28, 2020 From the Japan Patent Office Re. Application No. 2016-553475. (5 Pages).
Notification of Office Action Dated Apr. 23, 2020 From the State Intellectual Property Office of the People's Republic of China Re. Application No. 201580020795.5. (7 Pages).
Official Action Dated Apr. 29, 2020 from the US Patent and Trademark Office Re. U.S. Appl. No. 15/119,775. (20 pages).
Office Action Dated Apr. 13, 2021 From the Israel Patent Office Re. Application No. 254322 and Its Translation Into English. (5 Pages).
Communication Pursuant to Article 94(3) EPC Dated May 31, 2021 From the European Patent Office Re. Application No. 19191143.7. (5 Pages).
Interview Summary Dated Apr. 19, 2021 from the US Patent and Trademark Office Re. U.S. Appl. No. 15/119,775. (2 pages).
Office Action Dated May 31, 2020 From the Israel Patent Office Re. Application No. 254322 and Its Translation Into English. (11 Pages).
Communication of A Notice of Opposition Dated Jun. 14, 2022 From the European Patent Office Re. Application No. 15713237.4. (51 Pages).
Interview Summary Dated Jun. 24, 2020 from the US Patent and Trademark Office Re. U.S. Appl. No. 15/119,775. (3 pages).
Search Report and Explanation Dated Mar. 22, 2020 From the Servico Publico Federal, Ministerio da Economia, Instituto Nacional da Propriedade Industrial do Brasil Re. Application No. BR112013030990-3 and Its Summary in English. (5 Pages).

(56) References Cited

OTHER PUBLICATIONS

Examination Report Under Sections 12 & 13 of the Patents Act, 1970 and the Patents Rules, 2003 Dated Jan. 30, 2020 From the Government of India, Intellectual Property India, Patents, Designs, Trade Marks, Geographical Indications, The Patent Office Re. Application No. 2408/MUMNP/2013.
Office Action Dated Feb. 27, 2020 From the Israel Patent Office Re. Application No. 247345 and Its Translation Into English. (8 Pages).
European Search Report and the European Search Opinion Dated May 18, 2020 From the European Patent Office Re. Application No. 19191143.7. (6 Pages).
Translation Dated May 7, 2020 of Notice of Reason for Rejection Dated Apr. 28, 2020 From the Japan Patent Office Re. Application No. 2016-553475. (4 Pages).
Translation Dated May 20, 2020 of Notification of Office Action Dated Apr. 23, 2020 From the State Intellectual Property Office of the People's Republic of China Re. Application No. 201580020795.5. (9 Pages).
Examination Report Dated May 7, 2021 From the Instituto Mexicano de la Propiedad Industrial, Direccion Divisional de Patentes Re. Application No. MX/a/2016/010825. (4 Pages).

\* cited by examiner

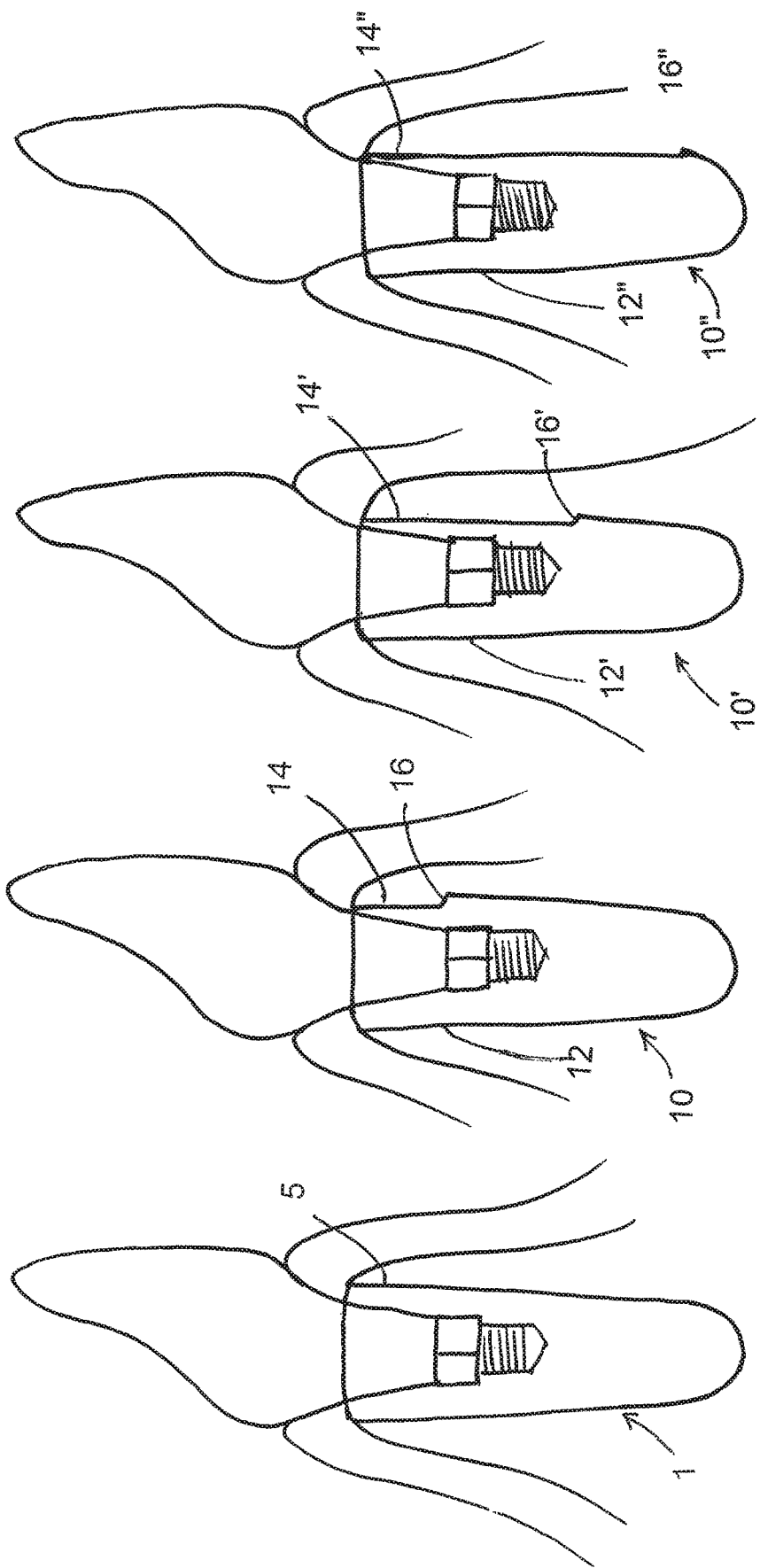

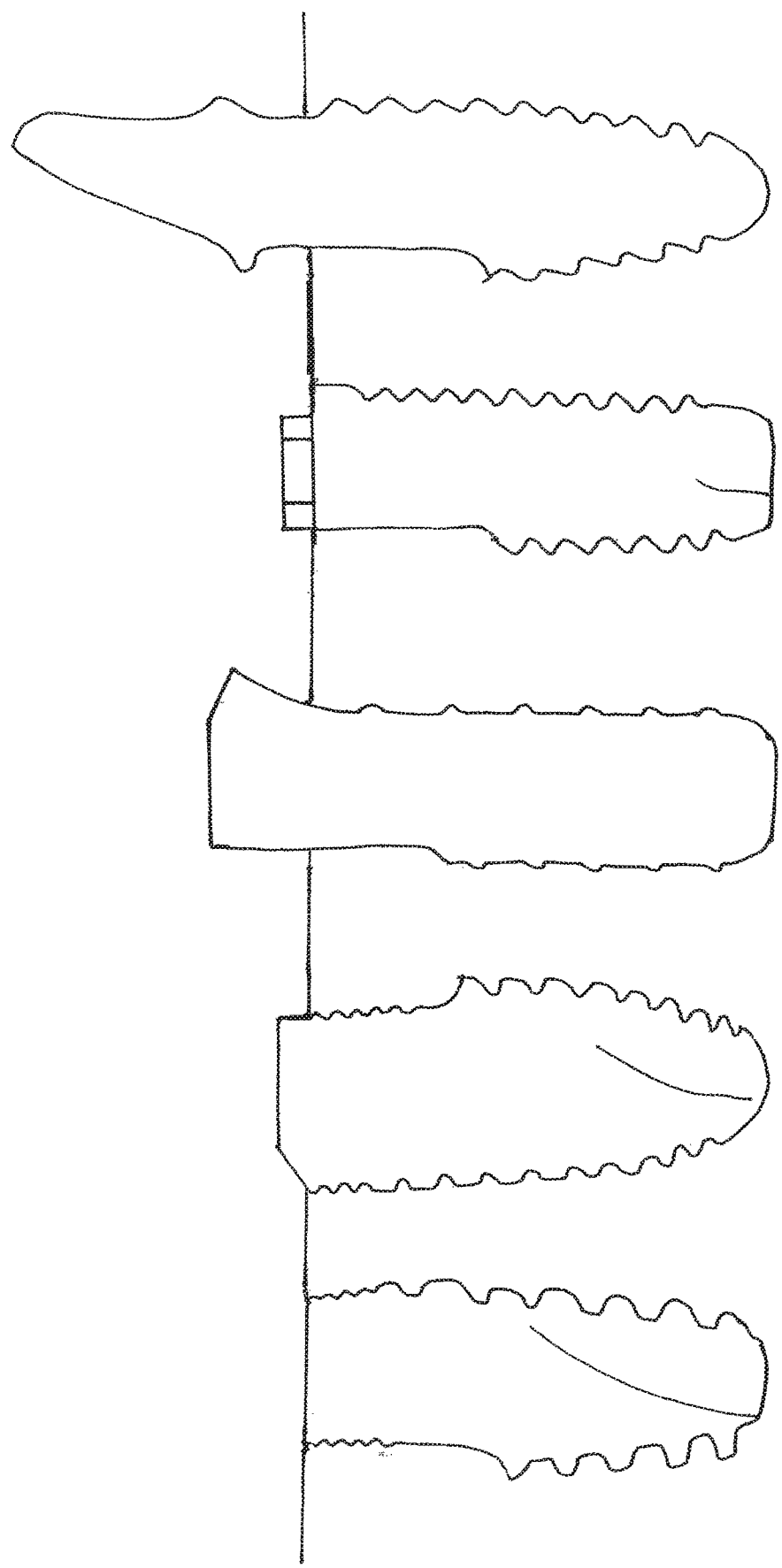

DENTAL IMPLANT

RELATED APPLICATIONS

This application is a division of U.S. patent application Ser. No. 14/123,289 filed on Dec. 2, 2013, which is a National Phase of PCT Patent Application No. PCT/IL2012/000218 having International Filing Date of Jun. 3, 2012, which claims the benefit of priority under 35 USC § 119(e) of U.S. Provisional Patent Application No. 61/492,382 filed on Jun. 2, 2011. The contents of the above applications are all incorporated by reference as if fully set forth herein in their entirety.

FIELD OF THE INVENTION

The present invention relates to the field of dental implants and, more particularly, to the design of the implant's head that maximizes long term stability of the hard and soft tissues surrounding the implant, the abutment and the prosthesis connected to it.

BACKGROUND OF THE INVENTION

Dental implants are used to replace teeth that have been lost. An implant is placed in the jaw bone at the site of the missing tooth and a dental prosthetic unit is attached to it. The long term functional and aesthetic success of dental implants, and the prostheses attached to them, is determined by the response of the hard and soft tissues around them. Throughout the history of the art of dental implantology, it has been known that some bone loss and subsequent soft tissue recession always occur and have to be accepted.

In recent years, it has been shown that bone loss and soft tissue loss can be lessened by improving the tissue environment around the head of the implant and its connection with the prosthetic unit. Several implant designs having reduced connection diameter provided more soft tissue volume above the implant head and around the prosthetic abutment and have shown better hard and soft tissue responses. See, for example, the conventional, prior art implant 1 shown in FIG. 1 and shown, in use, in FIG. 2. Implant 1 includes a body 2 having a root-like apex 3, typically with screw threads 4 around the outside surface, and an implant head 5 having a top surface 6. A screw receiving bore 7 is defined in body 2 for receiving the prosthetic unit, typically an abutment having an abutment screw 8 and a crown 9 mounted on the abutment.

However, bone loss still occurs where there is less bone thickness around the implant head. This effect is most evident, and results in the most disturbing outcome, when it occurs in the thin bone plates buccal to implants placed in the anterior region of the mouth where the tissues are exposed in the smile, as well as between adjacent implants, particularly in the anterior region. Dental professionals go to great lengths to prevent this effect by trying to locate the implant head away from the buccal plate, thus attempting to allow more bone thickness buccal to the implant head. But bone ridge size and implant dimensions may hinder their success.

Similarly, when adjacent implants are required, it may be difficult to leave sufficient space between the implants to permit the required tissue volume.

It is an established clinical fact that thicker buccal bone and larger bone volume are associated with reduced bone loss and reduced soft tissue loss. For that reason, smaller diameter implants are sometimes used in the anterior region of the mouth but at the expense of sacrificing mechanical strength of the fixture and of the connection or sacrificing prosthetic flexibility (such as when using one piece implants).

In addition, it is sometimes of great practical advantage to be able to directly access the abutment-to-implant connection screw through the crown unit. However, in the anterior maxillary regions, where it may be most desired to access from the lingual (palatal) direction, it is, in many cases, not possible due to the anatomy, size and orientation of the bone ridge (as seen in FIG. 2). To compensate for the angular limitations when restoring implants in the anterior maxillary region dentists sometimes resort to cemented crown solutions or use of angle-correcting prosthetic parts for screw retained crowns, which could sacrifice the preferred geometry of the sub-gingival prosthetic unit, the aesthetic outcome and connection strength (as by requiring smaller diameter screws).

Accordingly, there is a long felt need for a dental implant which results in reduced bone and soft tissue loss and which can be more successfully implanted in more problematic situations.

SUMMARY OF THE INVENTION

The present invention solves this problem by providing a modified head portion on the dental implant that allows more bone volume in critical locations around the implant head. At the same time, the mechanical strength of the implant and of the connection is maintained by retaining the remainder of the implant unchanged with reference to conventional implants. In this way, bone resorption and gum recession in critical areas around dental implants can be reduced.

There is thus provided, in accordance with the present invention, a dental implant including an implant body having a top surface, and at least one non-annular cutaway portion longitudinally extending downwardly from the top surface along one side of the body and outwardly to the periphery.

According to one embodiment of the invention, the dental implant further includes a screw receiving bore extending downwards from the top surface for coupling an abutment to the implant. The screw receiving bore may be concentric with the longitudinal axis of the implant, it may be non-concentric with the longitudinal axis of the implant, and/or it may be formed at an angle relative to the longitudinal axis of the implant.

According to another embodiment of the invention, the implant is a one-piece implant and the cut away portion extends along at least part of the intrabony portion and may include the trans-mucosal portion of the implant.

According to some embodiments, the cutaway portion is tapered. According to others, the cutaway portion ends in a shoulder. According to still others, the cutaway portion extends along the entire length of the body.

In some embodiments, there are two, oppositely disposed, cutaway portions longitudinally extending downwardly from the top surface along opposite sides of said body and outwardly to the periphery. In other embodiments, there are three cutaway portions longitudinally extending downwardly from the top surface, equidistant around the body and outwardly to the periphery.

Further according to the present invention, there is provided a dental implant including a body portion and a head portion integrally formed with the body portion, the head portion having a top surface; the body portion having a periphery and the head portion having a non-circular periphery; and wherein the periphery of the head portion is smaller than the periphery of the body portion.

There is further provided, in accordance with the invention, a method of forming a dental implant, the method including forming an implant body having a top surface; and cutting away at least one non-annular portion longitudinally extending downwardly from the top surface along one side of the body and outwardly to the periphery.

There is further provided, in accordance with the invention, a method of forming a dental implant, the method including providing a substantially cylindrical or conical implant body having a longitudinal axis; and forming a head portion having a top surface on the body. The head portion is formed by cutting away a portion of the periphery of the head portion so that the head portion has a non-circular periphery that is smaller than the periphery of the body.

BRIEF DESCRIPTION OF THE SEVERAL
VIEWS OF THE DRAWINGS

The present invention will be further understood and appreciated from the following detailed description taken in conjunction with the drawings in which:

FIG. 5a is a schematic sectional view of a conventional prior art implant in use;

FIGS. 5b, 5c and 5d are schematic sectional views of implants according to different embodiments of the invention having flattened portions of different lengths;

FIGS. 10a, 10b, 10c, 10d and 10e are side sectional views of implants of varying size and design, all formed according to different embodiments of the present invention;

DESCRIPTION OF SPECIFIC EMBODIMENTS
OF THE INVENTION

The present invention relates to a dental implant with a modified head portion that allows more bone in critical locations around the implant head without sacrificing the mechanical strength of the implant and of the connection. An object of the present invention is to reduce bone resorption in critical areas around dental implants by employing this modified design of the head of the implant.

The new design involves providing an implant having a body and an integrally formed head of substantially smaller periphery than the periphery of the body, where the periphery of the head is not annular. The implant includes an implant body having a top surface from which one or more parts of the circumference of the predominantly tubular shape of the implant body are cut away from the top surface down to a desired height. The flattened surface allows more bone thickness adjacent to it, as compared to an implant having a full contour tubular shape, as the cutaway area becomes filled with new bone growth. The gain in bone thickness in critical areas, such as where there is a thin buccal bone plate or a thin mandibular ridge or between adjacent implants, is substantial and results in a lower risk of bone resorption and the consequent aesthetic compromise.

Figure 1:
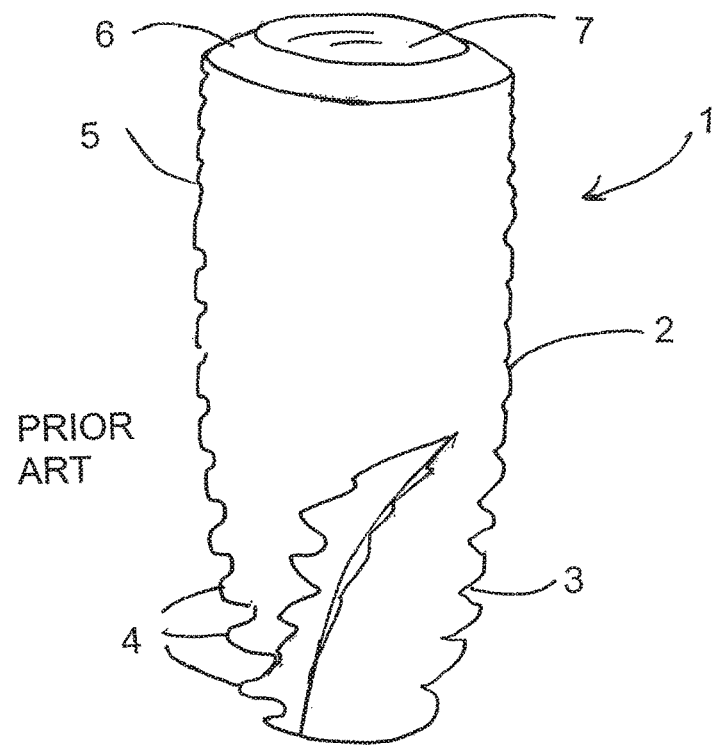
FIG. 1 is a schematic illustration of a prior art dental implant head.
Figure 2:
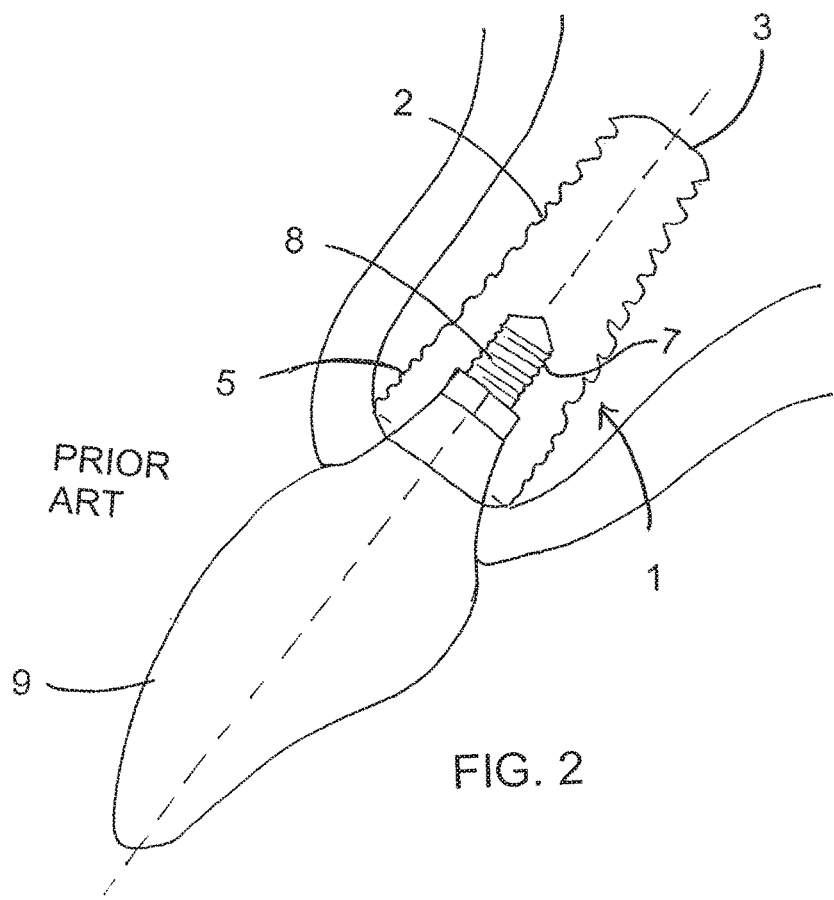
FIG. 2 is a schematic sectional illustration of the prior art dental implant of FIG. 1 in use.
Figure 3:
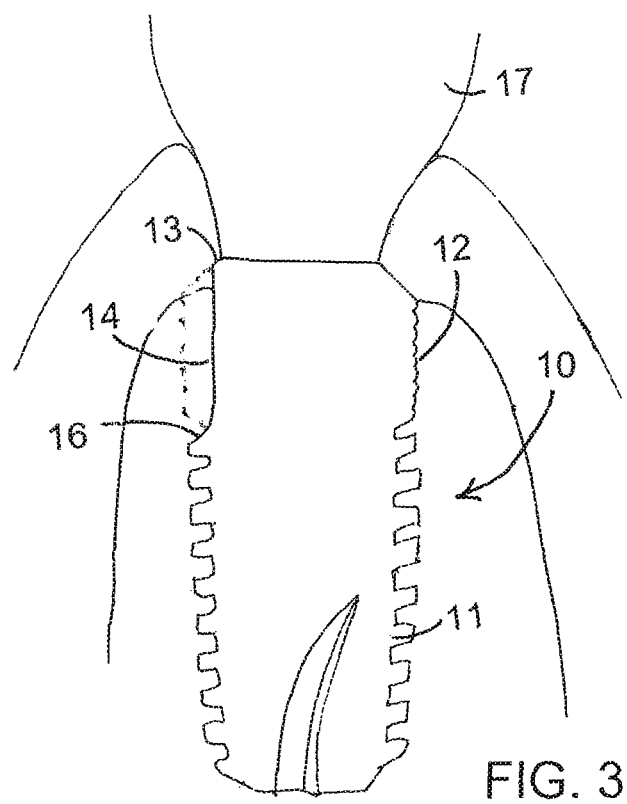
FIG. 3 is a schematic illustration of a dental implant constructed and operative in accordance with one embodiment of the present invention.
Figure 4:
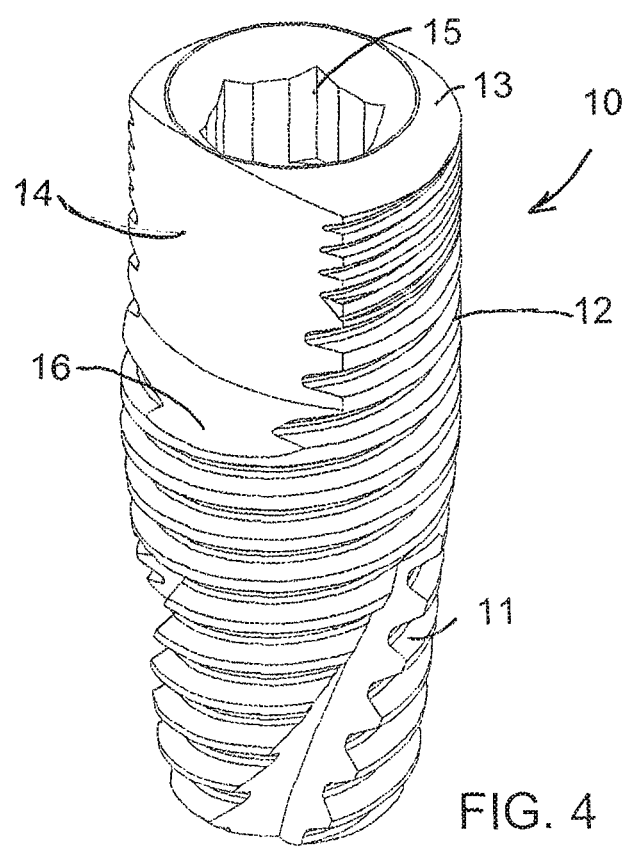
FIG. 4 is an isometric view of the implant head of the dental implant of FIG. 3.

One example of an implant 10 according to the present invention is shown in cross-section in FIG. 3, and in an isometric view in FIG. 4. Implant 10 includes an implant body 11 and an implant head 12 defining a top portion 13. Head 12 has a longitudinal, non-annular cutaway portion 14, extending downwards from top portion 13 and outwards to the periphery of the implant. The result is that the head 12 has a smaller periphery than the body. Implant 10 also includes a screw receiving bore 15 for receiving an abutment screw (not shown) to hold a prosthetic unit 17. The cutaway portion 14 of the implant head 12 is indicated in broken lines in FIG. 3, to show the substantial difference in periphery of the head produced by the cut away portion 14. The cutaway portion can extend along the length of the implant as far as desired and may be parallel to the longitudinal axis of the implant or tapered at an angle to the longitudinal axis or may end in a shoulder 16, as in the embodiment Illustrated in FIG. 3. Several examples of flattened portions of different lengths are shown in FIGS. 5b, 5c and 5d, shown alongside a conventional prior art implant in FIG. 5a.

Figure 6D:
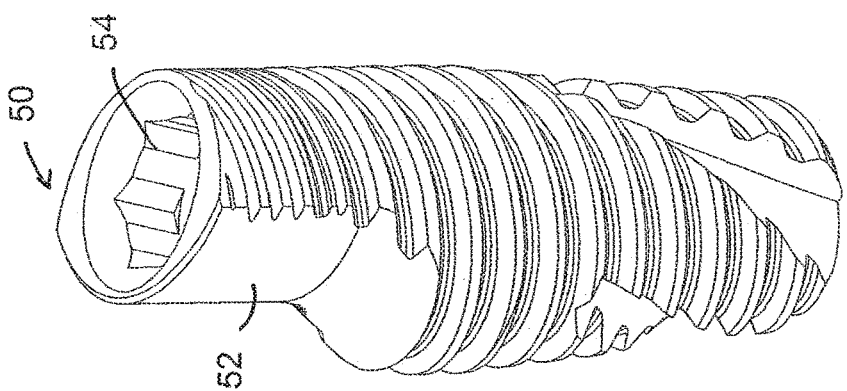
FIGS. 6a, 6b, 6c and 6d are isometric views of implants according to different embodiments of the invention having different arrangements of cutaway portions.
Figure 6C:
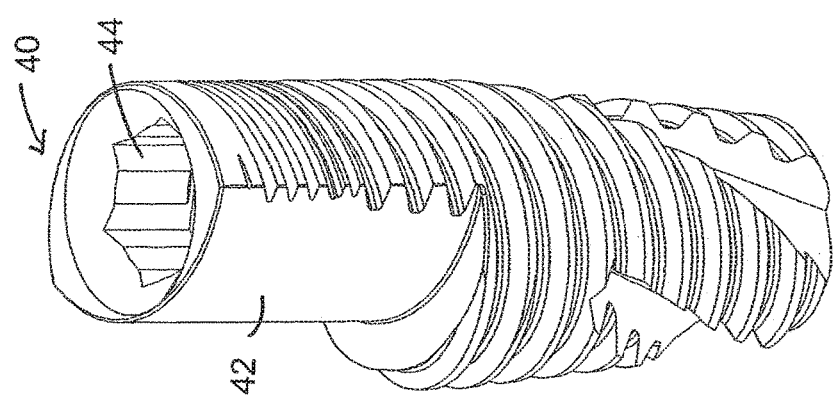
Figure 6A:
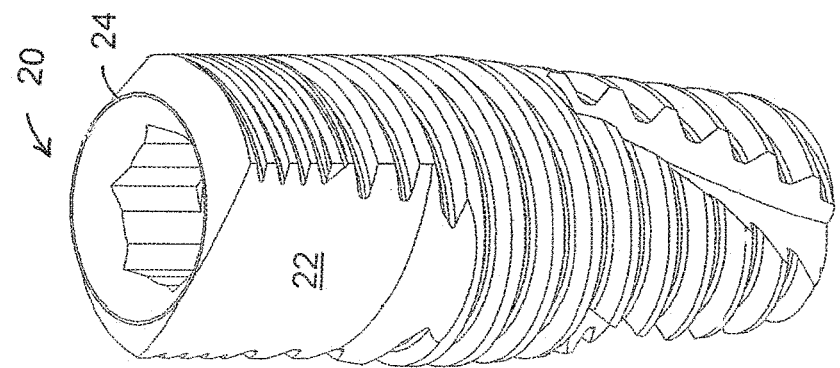
Figure 7D:
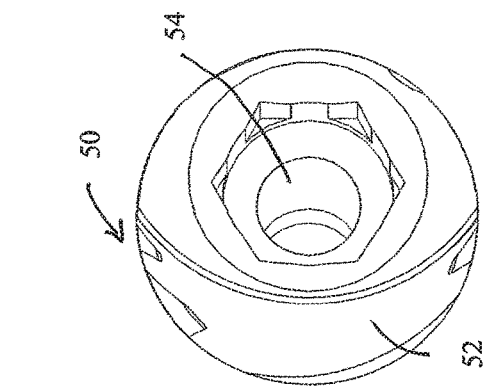
FIGS. 7a, 7b, 7c and 7d are top views of the implants of FIGS. 6a, 6b, 6c and 6d.
Figure 7C:
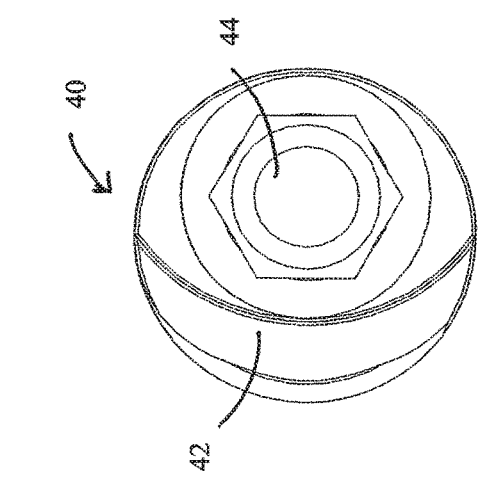
Figure 7A:
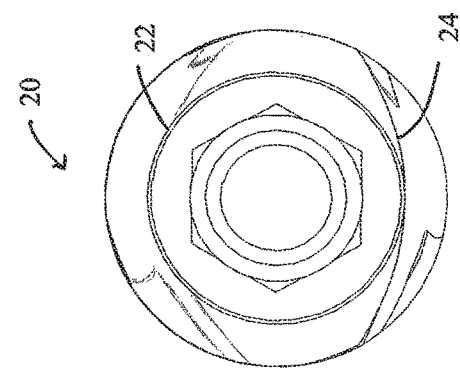
Figure 8A:
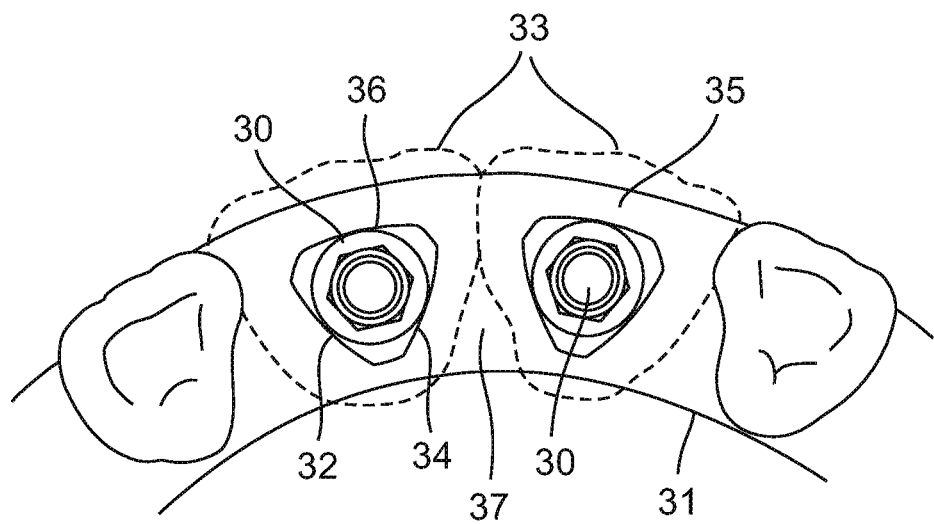
FIGS. 8a, 8b and 8c are schematic illustrations of three exemplary embodiments of implants according to the invention, in use.
Figure 8B:
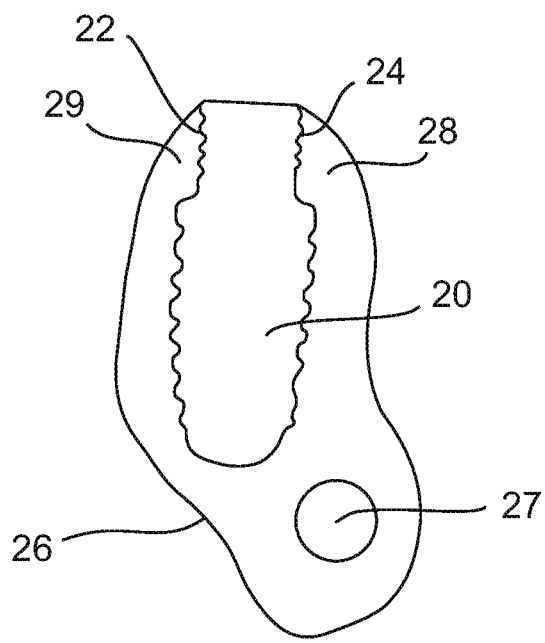

It should be noted that the topology of the cutaway portion of the implant head may be designed in any one of a variety of ways. The smaller periphery portion may be flat or planar, or it can be curved. If desired, the narrow periphery portion can have the same surface topology as the remainder of the head of the implant, for example, with microthreads or rings for improved adhesion to bone and tissue. As stated above, the smaller periphery head portion may extend to include any part of the implant's length up to its entire length. In addition, more than one longitudinal cutaway portion may be provided, preferably arranged symmetrically around the body. For example, FIG. 6a is an isometric view and FIG. 7a is a top view of an implant 20 having two cut away portions 22, 24, one opposite the other. This type of implant is particularly suitable where the bone ridge is narrow, for example, in the posterior mandible. See, for example, FIG. 8b, showing a cross-section of a posterior mandible 26 with a mandibular nerve canal 27. An implant 20 having cut away portions 22, 24 is implanted therein. As can be seen, the body of the implant remains of conventional size to retain the mechanical strength of the fixture and of the connection in the bone, but the head has a smaller periphery to provide narrow emergence in the buccal/lingual dimension, which permits minimum bone loss around the implant head and enhanced soft tissue response. Thus, an enlarged area 28 of bone buccal to the implant head and an enlarged area 29 of bone lingual to the implant head relative to conventional implants are obtained.

Figure 6B:
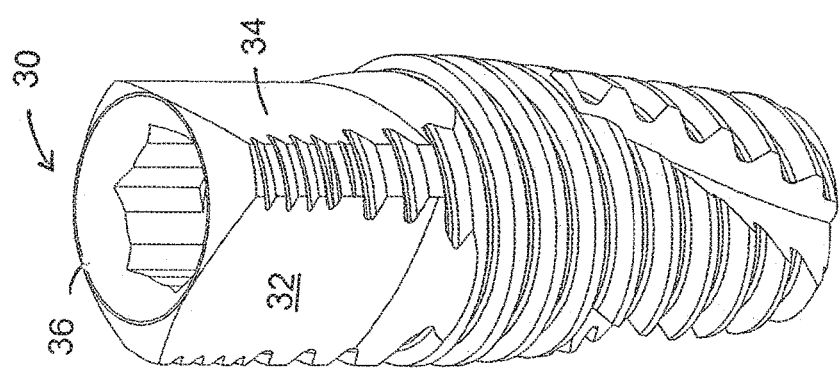
Figure 7B:
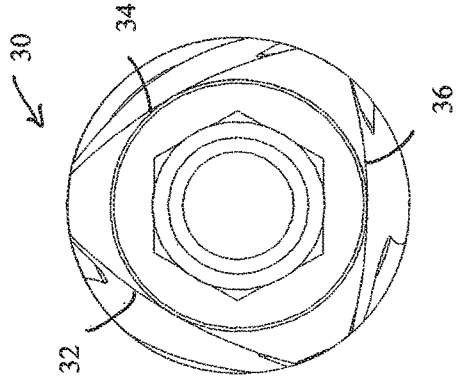

FIG. 6*b* shows an isometric view and FIG. 7*b* shows a top view of an implant 30 having three cutouts 32, 34, 36 equidistant about the longitudinal axis of the implant. This type of implant is particularly suitable for use with adjacent implants, particularly in areas where there is low bond volume buccal to the implant heads and between the implants. This design is particularly advantageous in the anterior part of upper jaw. See, for example, FIG. 8*a*, showing an occlusal view of an anterior maxillary bone crest 31 wherein two adjacent teeth 33 have been replaced with implants, after healing of the bone. Two implants 30 having cut away portions 32, 34, 36 are implanted in place of the two removed teeth. As can be seen, an enlarged area 35 of bone buccal to the implant heads and an enlarged area 37 of bone between the implant heads is provided, relative to conventional cylindrical (not cut away) implants.

According to certain embodiments of the invention, the screw receiving bore for connecting the abutment is not concentric with the longitudinal axis of the implant. This permits the periphery of the implant head to be even smaller than in the symmetrical implant according to the invention described above. FIG. 6*c* shows an isometric view and FIG. 7*c* shows a top view of an implant 40 having a single cutout 42, similar to the implant of FIG. 4, but having an eccentrically disposed screw receiving bore 44 substantially aligned with the longitudinal axis of the implant. This design provides an implant having an even larger cutout area than the concentric implant of FIG. 4, particularly useful in areas where it is desired to provide extra (maximum) bone volume.

Figure 8C:
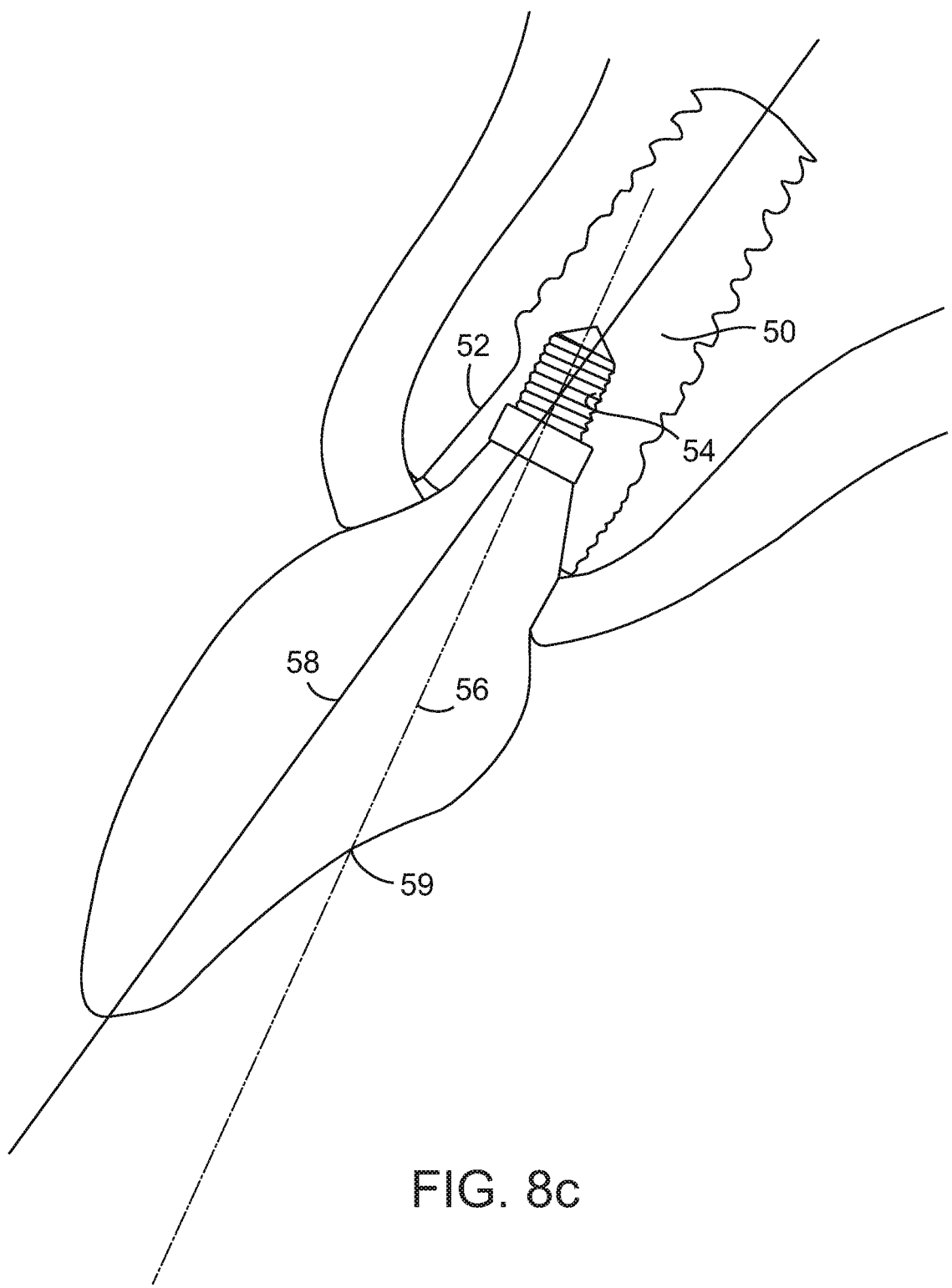

FIG. 6*d* shows an isometric view and FIG. 7*d* shows a top view of an implant 50 having a single cutout 52, similar to the implant of FIG. 6*c*, having a screw receiving bore 54 non-concentrically disposed relative to the longitudinal axis of the implant. However, in FIG. 6*d*, the screw receiving bore 54 is not aligned with the longitudinal axis of the implant but rather is formed at an angle thereto, as best seen in FIG. 7*d*. This design is particularly useful in the anterior region of the upper jaw to ensure extra volume of buccal bone and lingual access to the abutment screw. See, for example, FIG. 8*c*, where an implant 50 is shown, which has a screw receiving bore 54 having an axis 56 disposed at an angle to the longitudinal axis 58 of implant 50. It will be appreciated that this particular positioning allows for non symmetry in the location and angulation of the abutment connection and its screw relative to the implant. Thus, the connection and screw hole centers can be positioned more lingually (away from the cutout 52) and they can be oriented so as to greatly increase the probability that the abutment screw could be accessed from the lingual aspect 59 of the restoration.

Figure 9A:
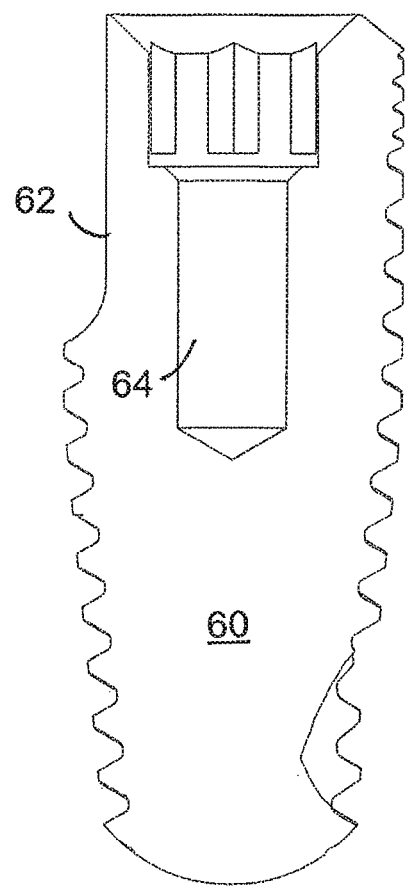
FIGS. 9a, 9b, 9c and 9d are side sectional illustrations of implants according to different exemplary embodiments of the invention.
Figure 9B:
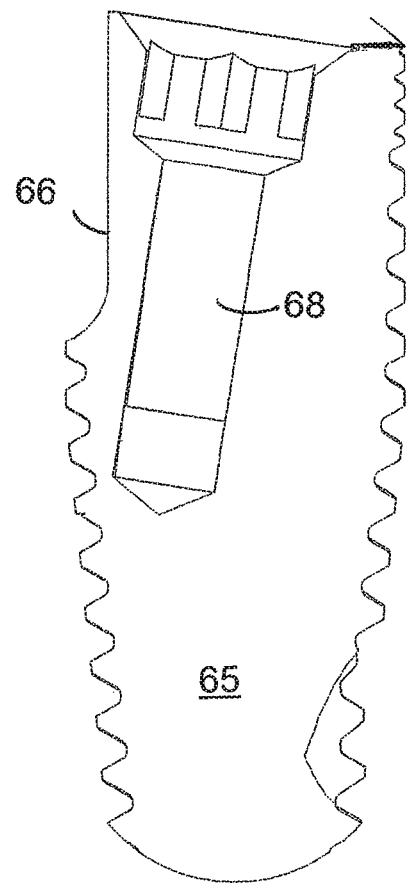
Figure 9C:
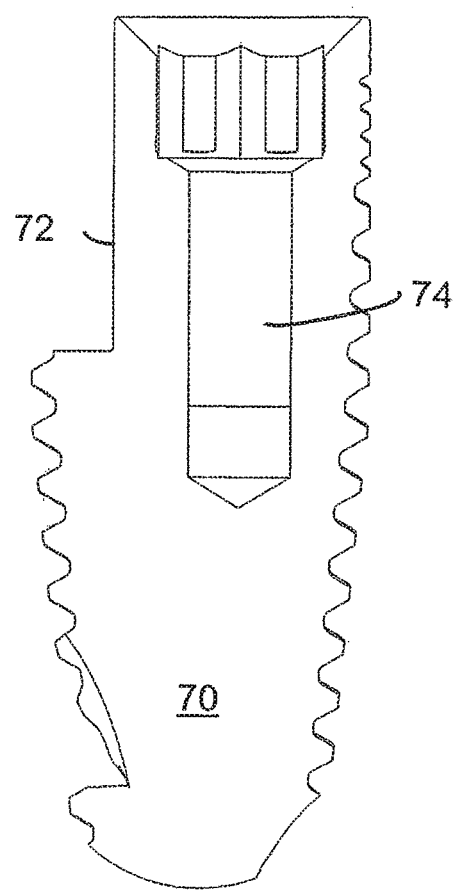
Figure 9D:
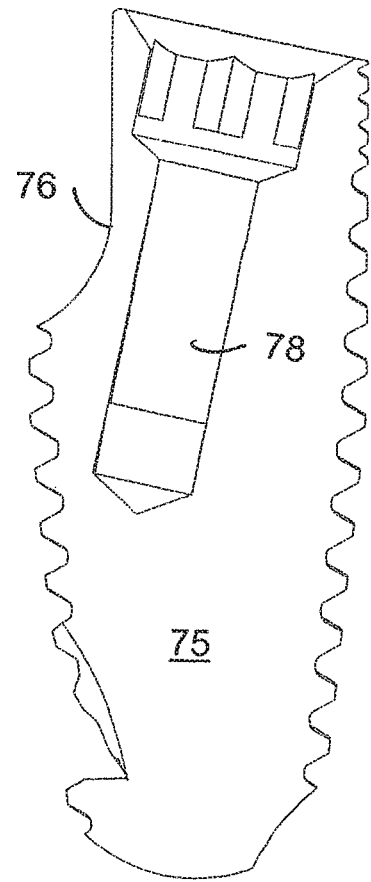

The connection itself (the interface between implant and abutment) could be tilted and in line with the tilted screw or, alternatively, the connection could be kept parallel to the longitudinal axis of the implant with just the screw hole and screw access tilted toward the lingual. FIGS. 9*a*, 9*b*, 9*c* and 9*d* provide side sectional illustrations of the various angular possibilities. FIG. 9*a* shows an implant 60 with a cutaway 62 and a screw receiving bore 64 concentrically located and aligned with respect to the longitudinal axis of the implant. FIG. 9*b* shows an implant 65 with a cutaway 66 and a screw receiving bore 68 concentrically located but tilted at an angle with respect to the longitudinal axis of the implant. FIG. 9*c* shows an implant 70 with a cutaway 72 and a screw receiving bore 74 eccentrically located but aligned with respect to the longitudinal axis of the implant. Thus, the cut away portion 72 is enlarged in width, relative to the implant of FIG. 9*a*. And FIG. 9*d* shows an implant 75 with a cutaway 76 and a screw receiving bore 78 eccentrically located and tilted at an angle with respect to the longitudinal axis of the implant. Thus, the cut away portion 76 can be enlarged in width, relative to the implant of FIG. 9*b*. It will be appreciated that any of these screw-receiving bore options can be used with any of the designs of implants described above and below and with any of the types of implants desired.

Thus, it will be appreciated that the particular design of the implant can be selected according to the location in the patient's mouth and the state of the patient's jaw.

It will be appreciated that the modified head design disclosed in the present invention can be applied to all implant designs, regardless of body shape, thread type, length, diameter, connection, surface treatment and material used, or whether it is a bone level, tissue level or one-piece implant. See, for example, FIGS. 10*a*-10*e*, each illustrating a different type or design of implant implementing the cutaway portion of the present invention. FIGS. 10*a* and 10*b* illustrate bone level implants. FIG. 10*c* illustrates a tissue level implant. FIG. 10*d* illustrates a bone level implant with an external connection and FIG. 10*e* illustrates a one-piece implant, having a prosthetic integrally formed with the implant body.

An implant with a single flattened or cut away area will have a single most proper (optimal) orientation (i.e., with the cut away area oriented adjacent the thin bone portion of the jaw). This type of implant, with a single cut away portion has a single proper orientation within a full 360 degree of rotational insertion and is better suited for smaller step, tighter thread implants or non-threaded implants. However, this characteristic may be a detriment in the case of threaded implants with a large thread step. While that may not be a problem in the anterior region where sub-bone-level positioning is often carried out, when this is an issue, the heads of the implants could be made with two or three cutouts, as illustrated above, so as to provide two-way or three-way symmetry. In this way, the implant can be rotated until any one of several cutout portions is disposed facing the problematic area of the jaw, so that additional bone growth will be possible in that area. These embodiments of the invention allow for smaller depth variability. A two cutout implant head allows two proper positions within every full rotation and a three cutout implant head allows three proper positions within every full rotation.

Similarly, proper, advantageous use of an implant incorporating the new design with the non concentric implant head (with just one cutout portion) requires a particular positioning of the implant head so that the cutout is always directed toward the area with reduced bone volume. Many times that would be towards the buccal. It will be appreciated that this particular positioning allows for non symmetry in the location and angulation of the abutment connection and its screw relative to the implant, as described above.

Figure 11C:
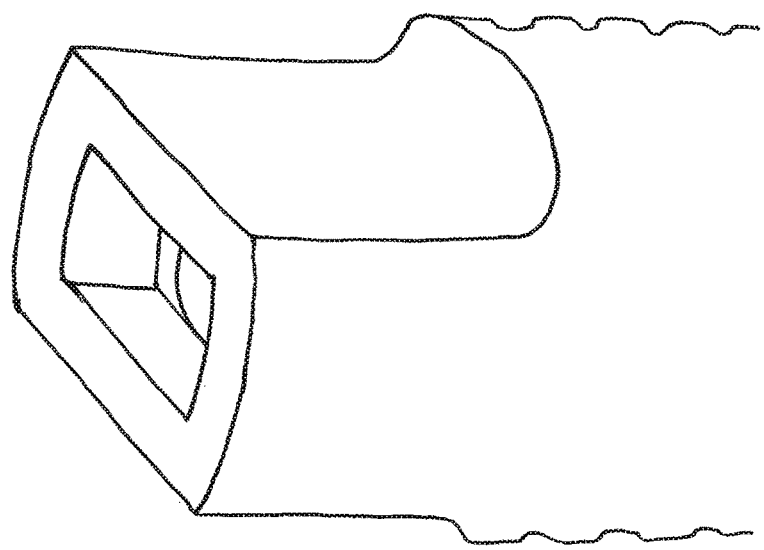
FIGS. 11a, 11b and 11c are schematic illustrations of implant heads according to further embodiments of the invention.
Figure 11B:
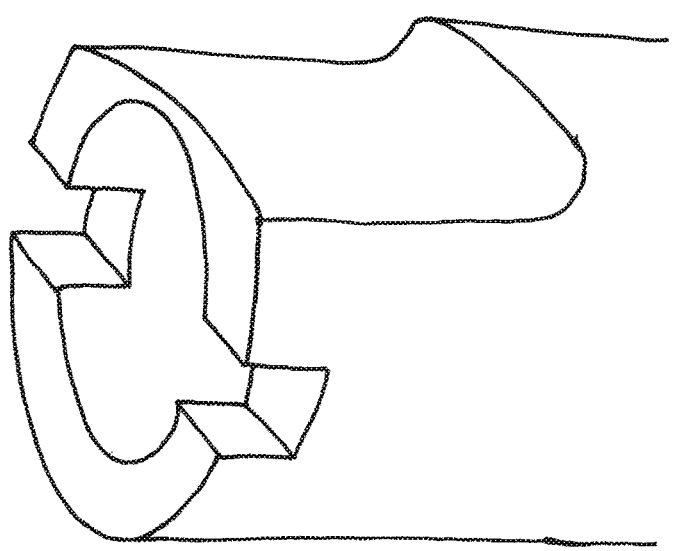
Figure 11A:
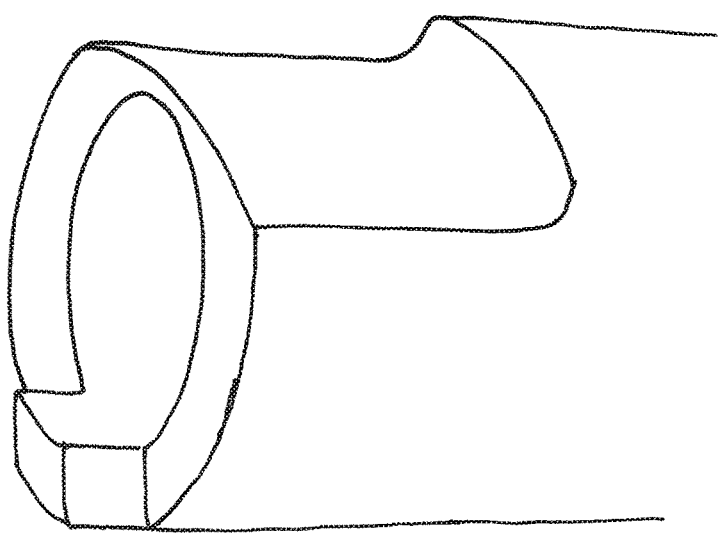

It should be noted that since the non concentric implant and the screw access are directionally confined, it is no longer necessary to adhere to rotational symmetry in the connection. Instead, the connection and the top surface of the implant could be made to suit the particular needs of such implant-abutment pair better than the conventional types of implant-abutment connections. Three exemplary instances of such a connection, having different features for receiving complementary features on the abutment, are depicted in FIGS. 11*a*, 11*b* and 11*c*. In FIG. 11*a*, the head defines a protrusion, in FIG. 11b, the head defines a flattened portion with notches, and in FIG. 11c, the head defines a rectangular connection.

Figure 12A:
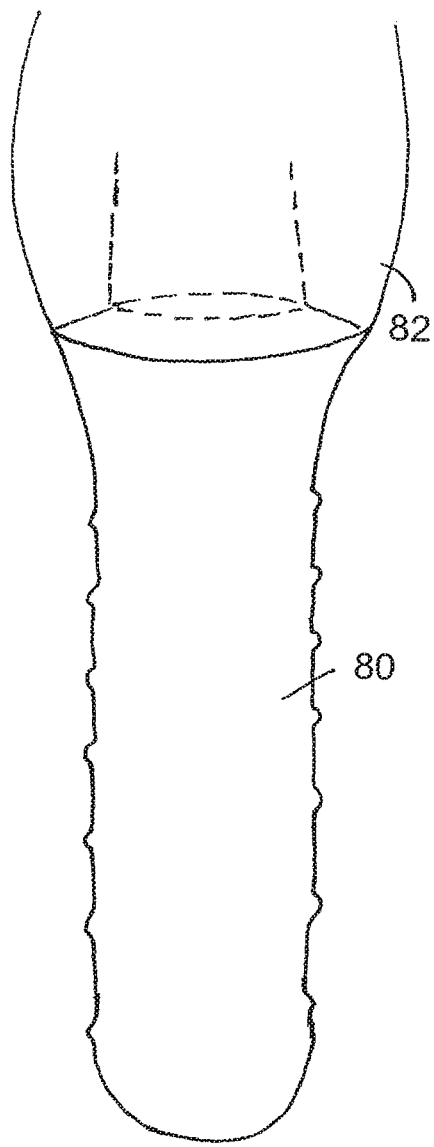
FIG. 12a is a schematic of a conventional prior art implant head with prosthetic unit.
Figure 12B:
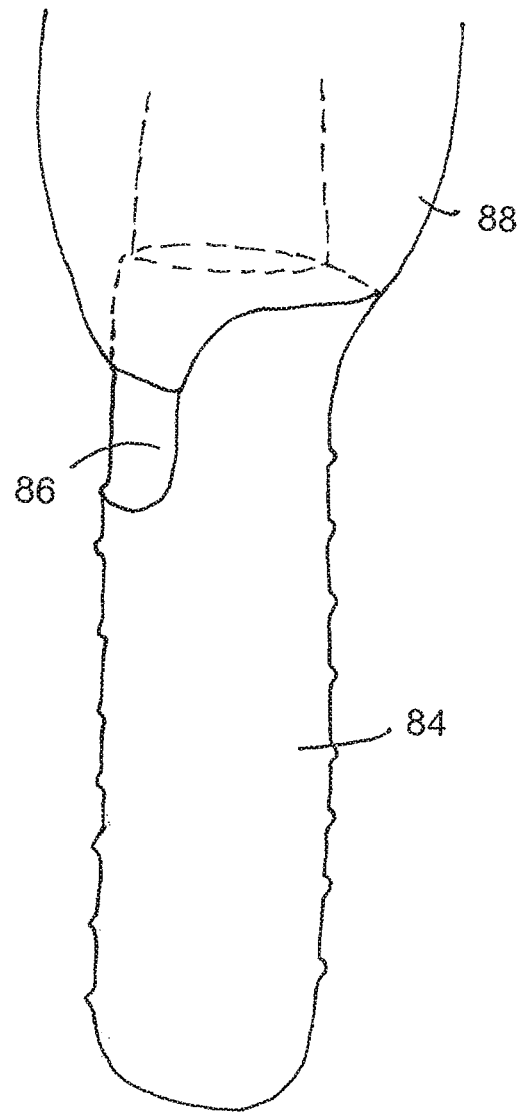
FIG. 12b is a schematic illustration of a dental implant according to a further embodiment of the invention. It will be appreciated that the drawings are only schematic and are not to scale.

A further advantage of the implants of the present invention is illustrated schematically in FIG. 12a, showing a prior art implant 80 with a prosthetic unit 82, and an implant 84, illustrated in FIG. 12b, according to one embodiment of the present invention. Implant 84 has a single cutaway 86 as described above. Prior art implant 80 is a tissue level implant where bone and tissue loss may occur. When it does, the metal implant 80 becomes visible. That may be very disturbing, particularly if located in the anterior portion of the mouth. The implant 84 of the present invention permits the prosthetic crown 88 to be extended along part or all of the length of the cut away portion 86. This portion is disposed to be visible in the mouth, so that even if there is some bone or tissue loss, the metal implant 84 will not be visible.

It will be appreciated that the above descriptions are intended only to serve as examples and that many other embodiments are possible and encompassed within the spirit and the scope of the present invention. The implants described herein and illustrated in the figures are examples only. Implants embodying other variations of the structures described here are within the scope of the present invention.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A dental implant comprising:
    a body and a head integrally formed with said body; said body having a circular periphery and said head having a non-circular periphery; said circular periphery and said non-circular periphery being transverse cross-sections transversing a longitudinal axis of said implant;
    wherein the non-circular periphery of said head comprises threaded portions;
    wherein said non-circular periphery of said head is characterized by a three-way symmetry having equidistant non-circular surfaces around said head;
    wherein at least a portion of said non-circular periphery of said head is curved; and
    wherein said body comprises threaded portions.

2. The dental implant according to claim 1, wherein said non-circular periphery of said head extends along a length of said body.

3. The dental implant according to claim 1, wherein at least a portion of said non-circular periphery is tapered.

4. The dental implant according to claim 1, wherein a circumference of the non-circular periphery of said head is smaller than a circumference of the circular periphery of said body.

5. The dental implant according to claim 4, wherein said circumference of the circular periphery of said body is the maximal circumference of said body.

6. The dental implant according to claim 1, wherein a circumcircle of the non-circular periphery of said head is at least as wide as the circumcircle of the body.

7. The dental implant according to claim 6, wherein said circumcircle of the non-circular periphery of said head is the widest circumcircle of the implant.

8. The dental implant according to claim 1, wherein said dental implant further comprises screw receiving bore extending downwards from the top surface for coupling an abutment to the implant.

9. The dental implant according to claim 1, wherein said implant is a one-piece implant and said head begins beneath a prosthetic portion of the implant.

10. The dental implant according to claim 1, wherein said body is substantially cylindrical or conical.

11. The dental implant according to claim 1, wherein said body includes threads.

12. The dental implant according to claim 1, wherein said implant comprises a prosthetic integrally formed with said implant body.

13. The dental implant according to claim 1, wherein said implant is a bone level implant.

14. The dental implant according to claim 1, wherein said implant is a tissue level implant, and said non-circular periphery continues into a bone level position.

15. The dental implant according to claim 8, wherein said bore is not concentric with the longitudinal axis of the implant.

16. The dental implant according to claim 8, wherein said bore is formed at an angle to a longitudinal axis of the implant.

17. The dental implant according to claim 1, wherein said at least portion of said non-circular periphery of said head that is curved face laterally of said dental implant.

18. The dental implant according to claim 1, wherein said at least portion of said non-circular periphery of said head that is curved are configured to engage bone tissue after said implant has been implanted.

19. The dental implant according to claim 1, wherein said head comprises three cutouts extending downwardly until said threads of said body.

20. The dental implant according to claim 1, wherein, when implanted in a jaw bone, said non-circular periphery allows for a space to be generated between said dental implant and said jaw bone at said head; said space allows growth of said jaw bone around said non-circular periphery of said head.

21. The dental implant according to claim 1, wherein said head is configured to be implanted in a jaw bone and, when implanted in said jaw bone, said threaded portions of said non-circular periphery contact said jaw bone.

22. The dental implant according to claim 1, wherein the non-circular periphery of said head is smaller than the circular periphery of the body.

* * * * *